US008669724B2

(12) United States Patent
Kureck et al.

(10) Patent No.: US 8,669,724 B2
(45) Date of Patent: Mar. 11, 2014

(54) METHOD AND APPARATUS FOR LOAD DEPENDENT SPEED CONTROL OF A MOTOR

(75) Inventors: Aaron S. Kureck, Oconomowoc, WI (US); Kurtis L. Verheyen, Shorewood, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 488 days.

(21) Appl. No.: 13/027,720

(22) Filed: Feb. 15, 2011

(65) Prior Publication Data

US 2012/0206074 A1 Aug. 16, 2012

(51) Int. Cl.
*H02P 29/02* (2006.01)

(52) U.S. Cl.
USPC ............ 318/162; 318/434; 318/474; 388/904

(58) Field of Classification Search
USPC ......... 318/560, 626, 646, 162, 430–434, 474; 388/904, 930, 935
See application file for complete search history.

(56) References Cited

U.S. PATENT DOCUMENTS

| 3,867,678 | A | * | 2/1975 | Stoner ........................... 318/432 |
| 3,886,417 | A | * | 5/1975 | Niwa ................................ 318/7 |
| 4,041,361 | A | | 8/1977 | Cornell |
| 4,376,970 | A | * | 3/1983 | Ilseman et al. .................. 700/56 |
| 5,027,049 | A | | 6/1991 | Pratt et al. |
| 5,235,259 | A | | 8/1993 | Dhindsa et al. |
| 6,184,648 | B1 | | 2/2001 | Kato et al. |
| 6,900,608 | B2 | * | 5/2005 | Kaplan et al. ............ 318/568.11 |
| 6,965,212 | B1 | | 11/2005 | Wang et al. |
| 7,353,959 | B2 | | 4/2008 | Zakula, Sr. et al. |
| 7,679,311 | B2 | | 3/2010 | Sopko et al. |
| 7,775,383 | B2 | | 8/2010 | Ueki et al. |

OTHER PUBLICATIONS

Magnetek, Impulse VG+ Series 3 Instruction Manual, Oct. 2009, pp. 5-27 to 5-28.

* cited by examiner

*Primary Examiner* — Bentsu Ro
(74) *Attorney, Agent, or Firm* — Boyle Fredrickson, S.C.

(57) ABSTRACT

A variable speed power converter controls the speed of a load in a material handling system as a function of the torque required to move the load. While the power converter is running, the torque being produced in the motor is determined. The power converter then determines the maximum rotational speed of the motor as a function of the torque currently being produced and of the torque-speed curve of the motor. The power converter then commands the motor to rotate at this maximum rotational speed. The power converter periodically monitors the torque being produced and adjusts the maximum rotational speed of the motor throughout the run.

19 Claims, 3 Drawing Sheets

METHOD AND APPARATUS FOR LOAD DEPENDENT SPEED CONTROL OF A MOTOR

BACKGROUND OF THE INVENTION

The subject matter disclosed herein relates to variable speed control of a motor. More specifically, the subject matter disclosed herein relates to a method and apparatus for controlling the speed of a motor used in a material handling system as a function of the load applied to the motor.

Material handling systems are widely used to lift heavy loads, weighing up to hundreds of tons. A typical material handling system includes at least one motor used to raise and lower the load and at least one additional motor to position the material handling system over the load to be moved. Common applications include manufacturing facilities, in which large components may be positioned for assembly and/or the final assembly may be moved for shipping. In the shipping industry, containers are loaded and unloaded between storage facilities, trucks, trains, and ships. Such material handling systems typically include a hook block, connected by a cable to a drum, which is, in turn, connected directly or indirectly through a gearbox, to the motor. The hook may be directly connected to a lifting point on the object or indirectly connected to the object via another lifting apparatus such as chains, slings, or custom structures. The motor then rotates in one direction to raise the load and in the other direction to lower the load.

Still other material handling systems are designed to handle application specific requirements of certain loads. For example, bulk materials such as sand or salt may require a bucket, or clam shell, attachment. The clam-shell is lowered in an open position and closed to scoop up a load of the bulk material. Scrap yards and recycling facilities may utilize a magnet attachment which, when energized, may be used to pick up ferrous metals. Still other attachments are used as dictated by the application requirements. As described above, it is apparent that material handling systems are an integral part of many manufacturing processes. As a result, the efficiency of the material handling system impacts the efficiency of the manufacturing process.

It is known that electric motors are capable of producing rated torque up to rated speed and at least a portion of rated torque when operating above rated speed. The portion of rated torque the motor is capable of producing decreases the further above rated speed the motor operates. Therefore, in order to increase the efficiency of the material handling system, it is desirable to operate the motor at the maximum speed at which the motor can operate and still produce sufficient torque to control the load being moved.

Historically, it is known that the weight of the load may be determined by including a load sensor or by detecting the magnitude of the current in the motor. Such systems either weigh the load prior to operating the motor or detect a current once the motor is operating at constant speed. The maximum operating speed is then determined once during the initial operation of the motor and a maximum speed is set for the duration of the run. Such a system may be suitable for applications in which the load is constant; however, material handling systems may experience applications in which the load is changing. If the load decreases during operation, the motor no longer operates at peak efficiency, and if the load increases during operation, the motor may not be able to produce sufficient torque at the current speed to maintain control of the load.

Thus, it would be desirable to provide a system to improve productivity of material handling systems in which the load changes during operation.

BRIEF DESCRIPTION OF THE INVENTION

The subject matter disclosed herein describes a variable speed power converter controlling the speed of a load in a material handling system as a function of the torque required to move the load. The torque produced in the motor is determined as the power converter is running. The power converter then determines a maximum rotational speed of the motor as a function of the torque currently being produced and of the torque-speed curve of the motor. The power converter then commands the motor to rotate at this maximum rotational speed. The power converter periodically monitors the torque being produced and adjusts the maximum rotational speed of the motor throughout the run.

According to a first embodiment of the invention, a motor drive for controlling rotation of a motor in a material handling system includes a memory device storing a series of processor executable instructions and a processor in communication with the memory device. The processor is configured to periodically execute the instructions to perform the following steps while rotating the motor: obtain a signal corresponding to a magnitude of torque produced by the motor, determine a maximum operating speed of the motor as a function of the magnitude of torque produced in the motor, and control the motor to rotate at the maximum operating speed. The signal obtained may be a current feedback signal, an estimated current value, or a value derived from either the current feedback signal or the estimated current value.

Thus, it is a feature of the invention that the maximum operating speed is periodically recalculated during the course of a run. Consequently, if the load changes during the run, the motor continues to run at the maximum operating speed at which it is capable of producing the torque required to control the load.

As another aspect of the invention, the maximum operating speed is a function of the direction of rotation of the motor. The signal corresponding to the magnitude of torque produced by the motor is filtered prior to determining the maximum operating speed. Additionally, the maximum operating speed is a function of a torque-speed characteristic of the motor, and the maximum operating speed is determined at least two times between starting and stopping the motor.

According to another embodiment of the invention, a power converter controls the rotation of a motor which, in turn, rotates a drum around which a cable is wound. The cable is alternately let out or wound in according to the direction of rotation of the drum to raise or lower a load in a material handling system. The power converter includes a processor and an input. The input is configured to receive a run command and to transmit the run command to the processor. The power converter also includes a sensor providing a feedback signal to the processor corresponding to a magnitude of the load, and a control module executing on the processor to periodically determine a maximum operating speed of the motor as a function of the feedback signal when the run command is present at the input.

As still another aspect of the invention, the control module further executes to output a new speed command to the motor as a function of the maximum operating speed. The processor may also execute a series of instructions to convert the feedback signal, corresponding to the magnitude of the load, to a torque feedback signal. A filter may receive either the feedback signal or the torque feedback signal as an input and generate a filtered output signal.

The power converter may also include a memory device in communication with the processor, and a plurality of parameters corresponding to a torque-speed curve of the motor. The maximum operating speed may be determined as a function of the filtered output signal and the plurality of parameters corresponding to the torque-speed curve of the motor. At least one input of the power converter may be configured to receive a command signal indicating the direction of rotation of the motor, and the maximum operating speed may also be a function of the direction of rotation of the motor.

As yet another aspect of the invention, the power converter may also include an input configured to receive a speed feedback signal corresponding to a rotational speed of the motor. The control module further executes to periodically compare the speed feedback signal to a predetermined threshold, and if the speed feedback signal is greater than the predetermined threshold, the motor drive indicates a fault condition and stops rotation of the motor, but if the speed feedback signal is less than the predetermined threshold, the motor drive continues to rotate the motor at the new speed command.

According to yet another embodiment of the invention, a method of controlling a motor used to selectively raise or lower a load in a material handling system with a motor drive receives a command signal at the motor drive to begin rotation of the motor to either raise or lower the load. At a periodic interval, the following steps are repeated while the command signal is present at the motor drive. A magnitude of torque produced by the motor during rotation of the motor is obtained from a signal in the motor drive. A maximum rotational speed of the motor is determined as a function of the magnitude of torque produced by the motor, and the speed of the motor is controlled with the motor drive to rotate at the maximum rotational speed. Rotation of the motor is stopped when the command signal is removed from the motor drive. The measured torque in the motor drive may be filtered prior to determining the maximum rotational speed of the motor, and the maximum rotational speed of the motor may further be a function of the direction of rotation of the motor.

As another aspect of the invention, the method may also retrieve a torque-speed profile prior to determining the maximum rotational speed, and the maximum rotational speed may also be a function of the torque-speed profile. Initially, a torque-speed profile for the motor may be stored in the motor drive, and the maximum rotational speed may be selected at a speed less than the speed indicated by the torque-speed profile.

As still another aspect of the invention, a speed feedback signal is received at the motor drive, which corresponds to the rotational speed of the motor. At a periodic interval, the speed feedback signal is compared to a predetermined threshold stored in the motor drive. The predetermined threshold is a function of the maximum rotational speed, and if the speed feedback signal is greater than the predetermined threshold, the motor drive indicates a fault condition, stopping rotation of the motor. However, if the speed feedback signal is less than the predetermined threshold, the motor drive continues to rotate the motor.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
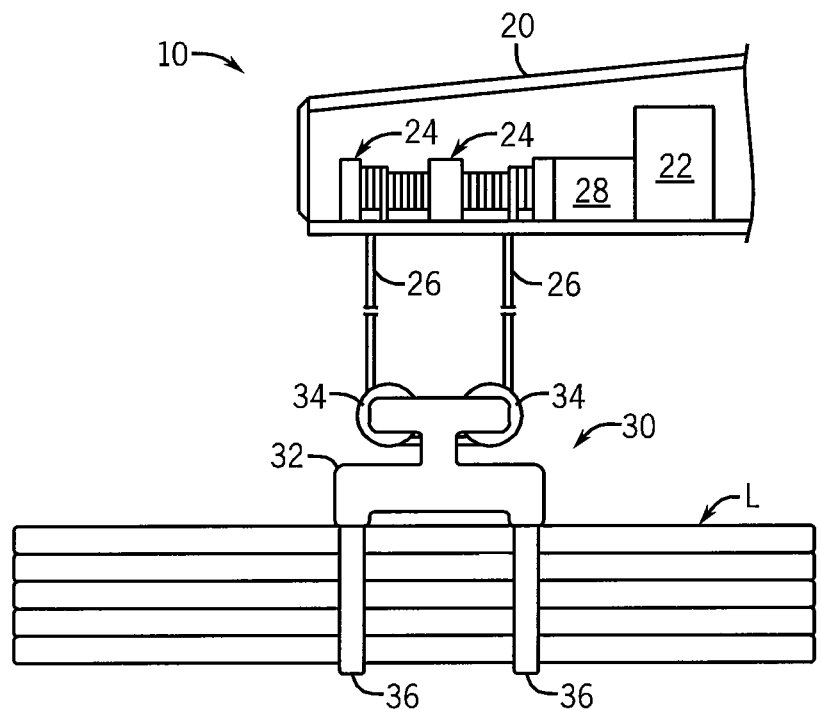
FIG. 1 is a partial schematic representation of a grapple crane, illustrating an exemplary environment incorporating the present invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, a grapple crane 10 includes a boom 20 from which the grapple 30 is suspended. The grapple 30 is suspended by a cable 26 which is secured to, and wound around, one or more drums 24. As illustrated, the cable 26 passes through two pulleys 34 mounted on an upper portion of a frame 32 of the grapple 30. The jaws 36 are pivotally mounted to a lower portion of the frame 32 and may be selectively opened or closed to release or grab a load, L, respectively. As is known in the art, many configurations of grapples 30 exist with, for example, varying frames 32, numbers of pulleys 34, or numbers and styles of jaws 36.

As illustrated, the drums 24 are rigidly mounted to the boom 20. Optionally, the drums 24 may be mounted remotely from the boom, for example, near the base of the crane, and the cables 26 may be routed around additional pulleys and up through the boom 20. The drums are rotated by a motor 28, which may be connected to the drums 24 directly or via a gearbox, according to the system requirements. The motor 28 is controlled by a motor drive 40, see FIG. 2, which is typically contained in an enclosure 22. The boom 20 may be connected to a mobile crane, such as a truck-mounted or track-mounted crane. Optionally, the boom 20 may be rigidly mounted across a work zone and the motor 28 and drums 24 may be mounted to a trolley, not shown, which travels along the boom 20. As still another option, the boom 20 may also be movably mounted to a pair of rails, not shown, allowing the boom 20 to travel along the rails in a first direction and the trolley to travel in a second direction, generally perpendicular to the first direction. It is contemplated that still other configurations of the boom 20, motor 28, and drums 24 may be used according to the system requirements.

Further, the exemplary embodiment is not intended to be limiting. The present invention may be incorporated into material handling systems utilizing other load handling members, including but not limited to overhead material handling systems incorporating a block and hook, a bucket, a clamshell attachment, or a magnet. Similarly, the present invention may be incorporated into winch-type applications which may spool out and reel in a cable along a more horizontal plane, including but not limited to a winch, a dredge, an anchor, or other side-pull systems. In each of the exemplary environments, the potential exists for the load, L, to vary during the course of a run.

The following definitions will be used to describe exemplary material handling systems throughout this specification. As used herein, the terms "raise" and "lower" are intended to denote the operations of letting out or reeling in a cable connectable to a load handling member of a material handling system and are not limited to moving a load in a vertical plane. The load handling member may be any suitable device for connecting to or grabbing a load, including, but not limited to, a hook block, a bucket, a clam-shell, a grapple, or a magnet. While an overhead crane may lift a load vertically, a winch may pull a load from the side. Further, an appropriately configured load handling member may allow a load to spool out cable or be reeled in at any desired angle between a horizontal plane and a vertical plane.

The "cable," also known as a "rope," may be of any suitable material. For example, the "cable" may be made from, but is not limited to, steel, nylon, plastic, other metal or synthetic materials, or a combination thereof, and may be in the form of a solid or stranded cable, chain links, or any other combination as is known in the art.

A "run" is one cycle of operation of the motor drive 40. The motor drive 40 controls operation of the motor 28, rotating the motor 28 to cause the cable 26 to wind around or pay out from the drum 24. A "run" may include multiple starts and stops of the motor and, similarly it may require multiple "runs" to let the cable 26 reel fully out or wind completely around the drum 24. Further, the cable 26 need not be fully let out or wound up before reversing direction of rotation of the motor 28. In addition, direction of rotation of the motor 28 may be reversed within a single run.

Figure 2:
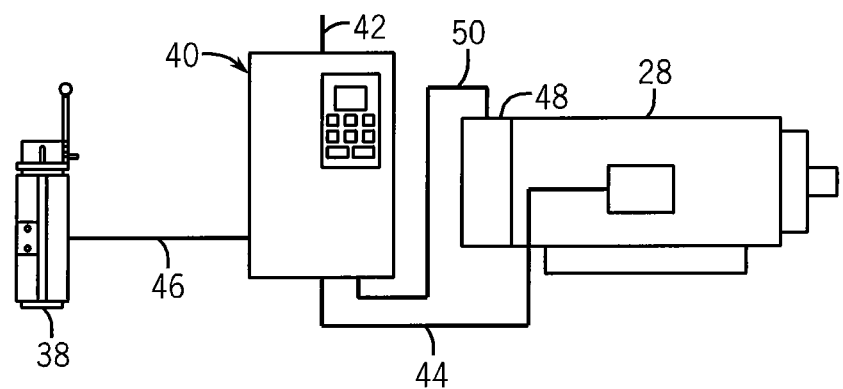
FIG. 2 is a block diagram of a controller for the exemplary environment of FIG. 1.

Referring next to FIG. 2, a controller 38, such as an industrial joystick, provides a command signal 46 to the motor drive 40 via an electrical connection. Optionally, the command signal 46 may be transmitted via a wireless connection. The motor drive 40 receives input power 42 which may be a single or multiple phase alternating current (AC) or direct current (DC) power source 42. The motor drive converts the input power 42 to a desired output power 44 to the motor 28, which may similarly be a single or multiple phase AC or DC output power 44 according to the application requirements. The motor 28 may include a position sensor 48 connected to the motor drive 40 via an electrical connection to provide a position feedback signal 50 corresponding to the angular position of the motor 28.

Figure 3:
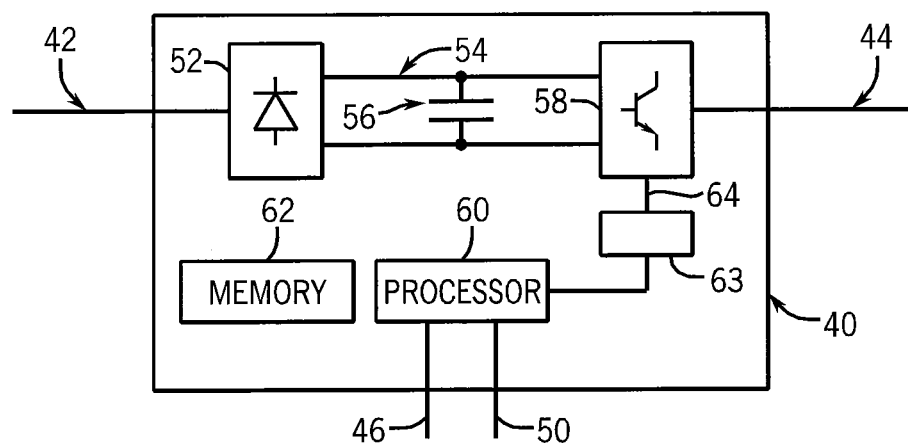
FIG. 3 is a block diagram representation of the motor drive of FIG. 2.

Referring next for FIG. 3, the motor drive 40 receives the input power 42 at a rectifier section 52. The rectifier section 52 may be either passive, such as a diode bridge, or active, including controlled power electronic devices such as transistors. Preferably, the input power 42 is converted to a DC voltage present on a DC bus 54. The DC bus 54 may include a bus capacitance 56 connected across the bus 54 to smooth the level of the DC voltage present on the bus. As is known in the art, the bus capacitance may include a single or multiple capacitors arranged in serial, parallel, or a combination thereof according to the power ratings of the motor drive 40. An inverter section 58 converts the DC voltage to the desired output power 44 for the motor 28 according to switching signals 64. The switching signals 64 may be determined by an application specific integrated circuit 63 receiving reference signals from a processor 60 or, optionally, directly by the processor 60 executing in the motor drive 40. The processor 60 is also connected to a memory 62. The memory 62 may be a single or multiple electronic devices, including static memory, dynamic memory, or a combination thereof. The memory 62 preferably stores operating parameters of the motor drive 40 and one or more programs, which include instructions executable on the processor 60.

Figure 4:
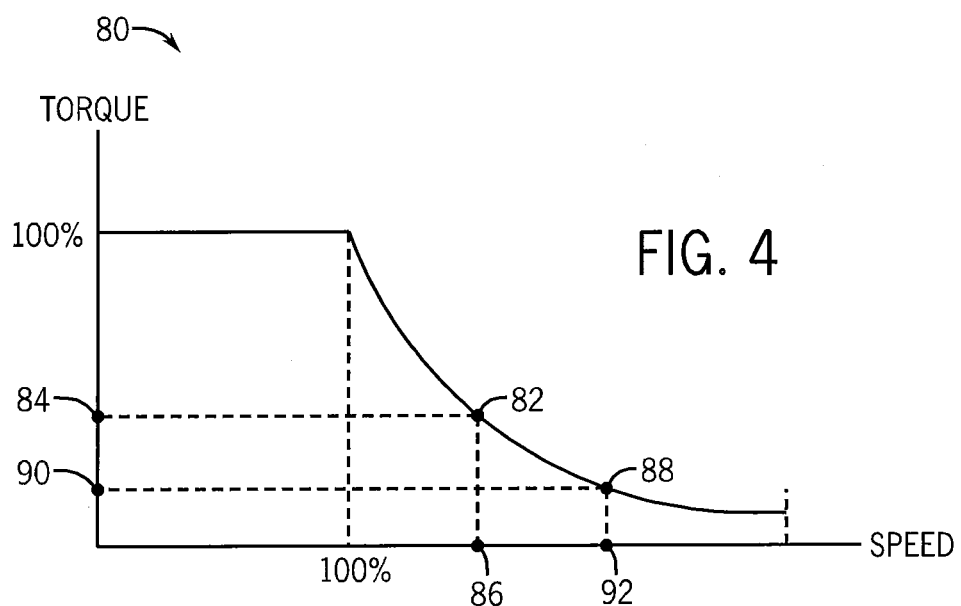
FIG. 4 is an exemplary torque-speed curve for a motor according to the present invention.

Referring next to FIG. 4, a torque-speed curve 80 describes the magnitude of torque that the motor 28 is capable of producing as a function of the speed at which the motor 28 is rotating. One or more default torque-speed curves 80 may be preconfigured and stored in memory 62. Preferably, the motor drive 40 includes parameters configurable to define at least one point on the torque-speed curve 80. Motors 28 are designed to output rated torque up to rated speed. Beyond rated speed, the amount of torque the motor 28 is capable of producing is reduced as described by the torque-speed curve 80. A first set point 82 is defined by a first torque parameter 84 indicating the torque the motor 28 is capable of producing at a first speed 86, and a second set point 88 is defined by a second torque parameter 90 indicating the torque the motor 28 is capable of producing at a second speed 92. Additional set points may be interpolated between known points and, optionally, additional set points may be defined by additional parameters.

Figure 5:
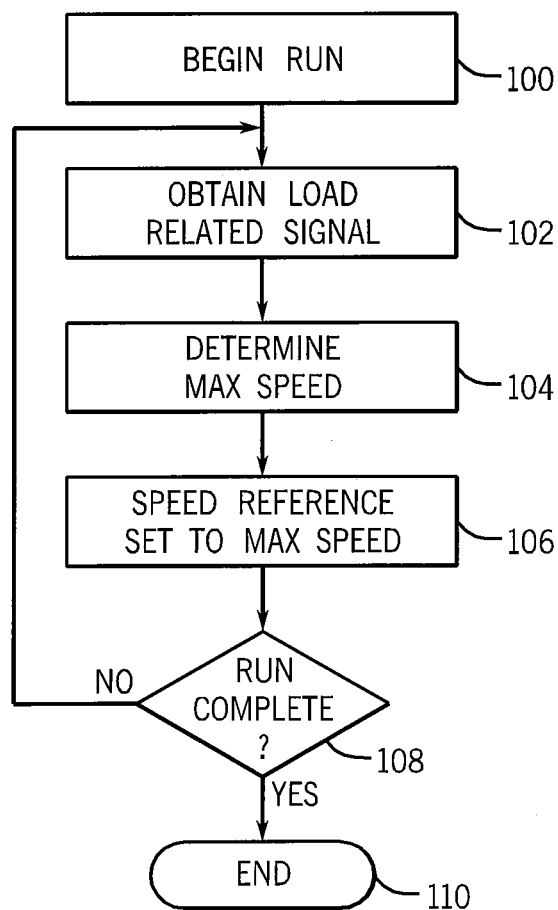
FIG. 5 is a flowchart illustrating the steps of the present invention.

In operation, the processor 60 executes to command rotation of the motor 28 up to a maximum speed as a function of the load, L, present on the material handling system. Referring next to FIG. 5, the motor drive 40 receives a command signal 46 to begin a run at step 100. The motor drive 40 monitors operation of the motor 28 during the run, including determining the amount of torque required by the motor 28 to maintain control of the load, L, at the commanded speed. At step 102, the processor 60 obtains a signal corresponding to the size of the load, L, being moved during the run. This signal may be a feedback signal input to the drive from a current sensor external to the drive or a load, L, weighing system installed on the material handling system. Optionally, the signal may also be a signal internal to the drive. The internal signal may be a measured signal from, for example, a current sensor internal to the drive 40 or a calculated signal derived from either a commanded or a measured signal. At step 104, the processor 60 determines a maximum speed at which the motor 28 can operate as a function of the size of load, L. Preferably, the maximum speed is determined at a point during the run when the torque is generally constant, for example near base speed. The speed reference is set to the maximum speed at step 106. At step 108, the processor 60 checks the command signal 46 to determine whether the run is complete. If the run is complete, the motor drive 40 brings the motor 28 to a controlled stop. If the run is not complete, the processor 60 again obtains the signal corresponding to the size of the load, L, being moved during the run and the steps are repeated. Steps 102-108 are periodically repeated throughout the course of the run.

In some material handling systems, the potential exists for the load, L, to change during the course of the run. Referring again to FIG. 1, the potential exists for the grapple 30 to be positioned other than at the center of the load, L. Further, the load, L, illustrated as a group of logs is often not uniformly distributed. Consequently, one end of the load, L, may remain on the ground, vehicle, or pile of other logs as the load, L, is raised. Further, due to the length of the logs and depending on the position of the grapple 30 along the length of the load, L, one end may remain on the ground for a significant portion of the run. The potential also exists for a log to fall from the grapple 30 if grasped too close to the end of the log. As a result of these potential loading conditions, the load, L, may vary, gradually or suddenly, during the course of a run.

In some material handling systems, the cable 26 itself may cause the motor 28 to experience a change in load, L, during the course of a run. Depending on the rated torque of the motor 28 and the length of the cable 26, the weight of the cable 26 may need to be factored into the weight of the load, L. As additional cable 26 is unwound from the drum 24, the weight of the load, L, applied to the motor increases, and as the cable 26 is wound back around the drum 24, the weight of the load, L, decreases. Further, the length of the cable 26 may be significant with respect to the width of the drum 24. As illustrated in FIG. 1, the cable 26 may be required to be wound back upon itself, also known as overwrap. In certain material handling systems, such as winches, the number of times which the cable 26 is wound about itself may be significant. The combined diameter of the cable 26 and drum 24 increases as more cable 26 is wound around the drum 24 and decreases as the cable 26 is unwound from the drum 24. The change in diameter may be significant enough, having a similar effect as changing gears in a gearbox, such that the torque applied to the load, L, changes if the speed of the motor 28 remains constant. Thus, the length of the cable 26 may result in a changing load, L, either due to changing weight or changing diameter on the drum 24, during the course of a run of a material handling system.

Material handling systems may be subject to changing loads, L, during the course of a run for still other factors. According to one embodiment, the material handling system may be mounted on a ship and be subject to wave motion. The ship on which the crane is mounted, the load, L, being raised by the crane, or both may rise or fall along with the crests and troughs of the waves. This motion alternately reduces or increases the tension in the cable 26 and, consequently, reduces or increases the torque required to control the load, L. According to another embodiment, the material handling system may include an electromagnetic attachment. The lifting force of the electromagnetic attachment may be varied during the course of a run by adjusting the strength of the electric field in the attachment. As the strength of the magnetic field increases or decrease, the size of the load attracted to the electromagnetic attachment similarly increases and decreases.

If the load, L, changes during the course of a run, the potential exists for the motor 28 to either operate at less than its maximum speed, reducing efficiency, or at a speed at which the motor 28 is no longer capable of producing sufficient torque to control the load, L. Periodically recalculating the maximum speed during the run permits the motor drive 40 to adjust the operating speed of the motor 28 to compensate for changes in the load, L, during the course of a run. It is desirable to perform the calculation at a frequent enough interval such that the motor drive 40 may respond to a change in load, L, without operating with insufficient torque to control the load, L. However, it is also undesirable to perform the calculation too often such that excessive bandwidth of the processor 60 is consumed by the calculation. According to one embodiment of the invention, the processor 60 recalculates the maximum speed at intervals from about 1 to about 20 ms.

Material handling systems are often subject to harsh operating environments. The potential exists for electrical noise to be present either in radiated or conducted emissions. Further, even in environments with minimal electrical noise, the motor drive itself may produce such emissions. As a result, the signal detecting the size of the load may be subject to such electrical noise resulting in frequent changes or erroneous spikes of significant magnitude in the feedback signal. Frequent changes or sudden large changes in the commanded speed may result in instability in the motor drive 40 or undesirable performance, such as vibrations, in the material handling system. Consequently, the signal corresponding to the size of the load, L, is preferably filtered to reduce the potential for changing the commanded speed too frequently. It is contemplated that any suitable filter may be employed, for example analog filtering on the feedback signal prior to being received at the motor drive 40 or digital filtering within the motor drive 40 after sampling the feedback signal.

The motor drive 40 may also be receiving a speed feedback signal 50 from a position sensor 48 mounted on the motor 28. The speed feedback signal 50 corresponds to the rotational speed of the motor 28. The motor drive 40 may further include fault detection algorithms, detecting, for example, an overspeed condition of the motor 28. During an overspeed condition, the actual speed of the motor 28 exceeds a preset speed, typically a small percentage above the rated speed of the motor 28. If the processor 60 determines that the motor 28 may operate at a maximum speed above the current preset speed at which an overspeed condition may be detected, the processor 60 preferably determines a new preset speed as a function of the maximum speed, and stores the new preset speed in memory 62. Thus, the maximum operating speed calculation preferably interacts with fault condition detection to prevent inadvertent fault detection from occurring.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A motor drive for controlling rotation of a motor in a material handling system, comprising:
   an input configured to receive a command signal from a controller, wherein he controller is manually manipulated by an operator to generate the command signal;
   a memory device storing a series of processor executable instructions; and
   a processor in communication with the memory device, wherein the processor is configured to execute the instructions to:
   control the motor to rotate at a speed command responsive to the command signal;
   when the motor is rotating, periodically obtain a signal corresponding to a magnitude of torque produced by the motor and determine a maximum operating speed of the motor as a function of the magnitude of torque produced in the motor, when the maximum operating speed is greater than the speed command, increase the speed command to the maximum operating speed, and when the maximum operating speed is less than the speed command, decrease the speed command to the maximum operating speed.

2. The motor drive of claim 1 wherein the signal corresponding to a magnitude of torque is one of a current feedback signal, an estimated current value, and a value derived from the current feedback signal or the estimated current value.

3. The motor drive of claim 1 wherein the maximum operating speed is a function of the direction of rotation of the motor.

4. The motor drive of claim 1 wherein the signal corresponding to the magnitude of torque produced by the motor is filtered prior to determining the maximum operating speed.

5. The motor drive of claim 1 wherein the maximum operating speed is a function of a torque-speed curve stored in the memory device.

6. The motor drive of claim 1 wherein the maximum operating speed is determined at least two times between starting and stopping the motor.

7. A power converter controlling the rotation of a motor which, in turn, rotates a drum, around which a cable is wound, wherein the cable is alternately let out or wound according to the direction of rotation of the drum to raise or lower a load in a material handling system, the power converter comprising:
a processor;
an input configured to receive a run command from a controller, wherein the controller is manually manipulated by an operator to generate the run command, and to transmit the run command to the processor;
a sensor providing a feedback signal to the processor corresponding to a magnitude of the load; and
a control module executing on the processor to:
control the motor to rotate at a speed command responsive to the run command,
periodically determine a maximum operating speed of the motor as a function of the feedback signal when the run command is present at the input,
when the maximum operating speed is greater than the speed command, increase the speed command to the maximum operating speed, and
when the maximum operating speed is less than the speed command, decrease the speed command to the maximum operating speed.

8. The power converter of claim 7 wherein the processor executes a series of instructions to convert the feedback signal, corresponding to the magnitude of the load, to a torque feedback signal.

9. The power converter of claim 8 further comprising a filter receiving one of the feedback signal, corresponding to the magnitude of the load, and the torque feedback signal as an input and generating a filtered output signal.

10. The power converter of claim 9 further comprising:
a memory device in communication with the processor; and
a plurality of parameters corresponding to a torque-speed curve of the motor stored in a memory device, wherein the maximum operating speed is determined as a function of the filtered output signal and the plurality of parameters corresponding to the torque-speed curve of the motor.

11. The power converter of claim 10 further comprising at least one input configured to receive a command signal indicating a desired direction of rotation of the motor, wherein the maximum operating speed is also a function of the desired direction of rotation of the motor.

12. A power converter controlling the rotation of a motor which, in turn, rotates a drum, around which a cable is wound, wherein the cable is alternately let out or wound in according to the direction of rotation of the drum to raise or lower a load in a material handling system, the power converter comprising:
a processor:
an input configured to receive a run command and to transmit the run command to the processor;
an input configured to receive a speed feedback signal corresponding to a rotational speed of the motor;
a sensor providing a feedback signal to the processor corresponding to a magnitude of the load; and
a control module executing on the processor to:
periodically determine a maximum operating speed of the motor as a function of the feedback signal corresponding to the magnitude of the load when the run command is present at the input, and
output a new speed command to the motor as a function of the maximum operating speed,
periodically compare the speed feedback signal to a predetermined threshold, and if the speed feedback signal is greater than the predetermined threshold, the motor drive indicates a fault condition and stops rotation of the motor, but if the speed feedback signal is less than the predetermined threshold, the motor drive continues to rotate the motor at the new speed command.

13. A method of controlling a motor used to selectively raise or lower a load in a material handling system with a motor drive, comprising the steps of:
generating a command signal via an operator manually manipulating a controller;
receiving the command signal at the motor drive to begin rotation of the motor to either raise or lower the load at a commanded speed:,
repeating at a periodic interval the following steps while the command signal is present at the motor drive:
obtaining a magnitude of torque produced by the motor during rotation of the motor from a signal in the motor drive,
determining a maximum rotational speed of the motor as a function of the magnitude of torque produced by the motor,
increasing the commanded speed to the maximum operating speed when the maximum operating sped greater than the commanded speed, and
decreasing the commanded speed to the maximum operating speed when the maximum operating speed is less than the commanded speed; and
stopping rotation of the motor when the command signal is removed from the motor drive.

14. The method of claim 13 further comprising the step of filtering the magnitude of torque in the motor drive prior to determining the maximum rotational speed of the motor.

15. The method of claim 13 wherein the maximum rotational speed of the motor is also a function of a direction of rotation of the motor.

16. The method of claim 13 further comprising the step of retrieving a torque-speed profile prior to determining the maximum rotational speed and wherein the maximum rotational speed is also a function of the torque-speed profile.

17. The method of claim 16 further comprising an initial step of storing a torque-speed profile for the motor in the motor drive.

18. The method of claim 16 wherein the maximum rotational speed is selected at a speed less than the speed indicated by the torque-speed profile.

19. A method of controlling a motor used to selectively raise or lower a load in a material handling system with a motor drive, comprising the steps of
receiving a command signal at the motor drive to begin rotation of the motor to either raise or lower the load;
repeating at a periodic interval the following steps while the command signal is present at the motor drive:
obtaining a magnitude of torque produced by the motor during rotation of the motor from a signal in the motor drive,
determining a maximum rotational speed of the motor as a function of the magnitude of torque produced by the motor, and
controlling the speed of the motor with the motor drive to rotate at the maximum rotational speed:
stopping rotation of the motor when the command signal is removed from the motor drive;
receiving a speed feedback signal at the motor drive corresponding to the rotational speed of the motor; and
at a periodic interval, comparing the speed feedback signal to a predetermined threshold stored in the motor drive wherein the predetermined threshold is a function of the maximum rotational speed and wherein if the speed feedback signal is greater than the predetermined threshold, the motor drive indicates a fault condition and stops rotation of the motor, but if the speed feedback signal is less than the predetermined threshold, the motor drive continues to rotate the motor.

* * * * *